United States Patent
Wang et al.

(10) Patent No.: US 10,235,818 B2
(45) Date of Patent: Mar. 19, 2019

(54) ADAPTIVE VEHICLE CONTROL

(71) Applicant: Ford Global Technologies, LLC, Dearborn, MI (US)

(72) Inventors: Jing Wang, Canton, MI (US); Yan Wang, Ann Arbor, MI (US); Dimitar Petrov Filev, Novi, MI (US); John Ottavio Michelini, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 81 days.

(21) Appl. No.: 15/154,166

(22) Filed: May 13, 2016

(65) Prior Publication Data

US 2017/0330395 A1 Nov. 16, 2017

(51) Int. Cl.
  *G06F 19/00* (2018.01)
  *G07C 5/08* (2006.01)
  *B60W 30/188* (2012.01)

(52) U.S. Cl.
  CPC ....... *G07C 5/0816* (2013.01); *B60W 30/1882* (2013.01); *B60W 2510/0604* (2013.01); *B60W 2510/0676* (2013.01); *B60W 2510/182* (2013.01); *B60W 2510/20* (2013.01); *B60W 2530/20* (2013.01)

(58) Field of Classification Search
  CPC ............ G07C 5/0816; B60W 30/1882; B60W 2510/0604; B60W 2510/0676; B60W 2510/182; B60W 2510/20; B60W 2530/20
  USPC ........................................ 701/36, 41; 700/26
  See application file for complete search history.

(56) References Cited

U.S. PATENT DOCUMENTS

| 6,757,601 | B1 | 6/2004 | Yao et al. |
| 7,328,577 | B2 | 2/2008 | Stewart et al. |
| 7,415,389 | B2 * | 8/2008 | Stewart ................. G05B 11/42 700/26 |
| 2009/0082923 | A1 * | 3/2009 | Gerdes ................. B60W 30/04 701/41 |

(Continued)

FOREIGN PATENT DOCUMENTS

| CN | 104564385 | 4/2015 |
| WO | 2010116492 A1 | 10/2010 |

OTHER PUBLICATIONS

UK Search Report dated Aug. 26, 2017 re Appl. No. GB1707209.1.

*Primary Examiner* — Shardul D Patel
(74) *Attorney, Agent, or Firm* — Frank A. MacKenzie; Bejin Bieneman PLC

(57) ABSTRACT

A controller includes a processor programmed to determine, for a vehicle, a first control input based on input data and first reference parameters. The processor is further programmed to operate the vehicle according to the first control input. Based on operating data of the vehicle for an operating condition, the processor determines a second control input for the vehicle. Operating the vehicle according to the second control input reduces a cost of operating the vehicle relative to operating the vehicle according to the first control input. The processor is further programmed to determine, based on the second control input, second reference parameters. The controller generates a third control input based on the second reference parameters and the input data. A cost of operating the vehicle according to the third control input is reduced relative to the cost of operating the vehicle based on the first control input.

20 Claims, 7 Drawing Sheets

(56) References Cited

U.S. PATENT DOCUMENTS

| | | | |
|---|---|---|---|
| 2012/0029803 A1* | 2/2012 | Yasushi | B60R 16/0236 701/123 |
| 2013/0152549 A1* | 6/2013 | Light-Holets | F01N 9/00 60/274 |
| 2013/0177826 A1* | 7/2013 | Harris | H01M 8/04955 429/428 |
| 2013/0184961 A1* | 7/2013 | Kumar | F02C 9/28 701/100 |
| 2016/0147203 A1* | 5/2016 | Di Cairano | G05B 13/042 700/30 |
| 2016/0147263 A1 | 5/2016 | Choi et al. | |
| 2016/0193992 A1* | 7/2016 | Hancock | B60K 6/48 701/22 |
| 2017/0203766 A1* | 7/2017 | Prokhorov | B60W 40/09 |

* cited by examiner

ADAPTIVE VEHICLE CONTROL

BACKGROUND

Vehicle control is commonly performed with the use of baseline lookup tables that are constructed by inverting vehicle steady-state characteristics. The lookup tables are typically calibrated to deliver optimal steady-state performance and may result in non-optimal performance during transient operations.

DESCRIPTION

Introduction

Figure 1:
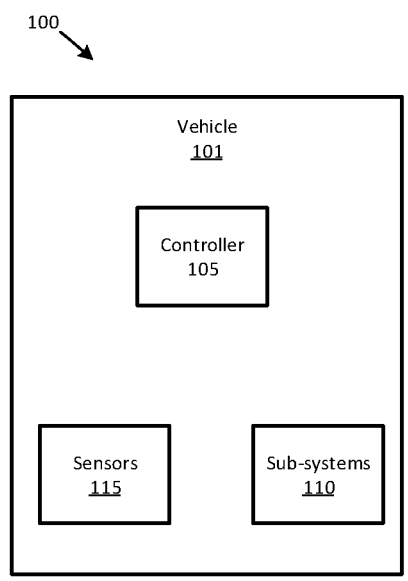
FIG. 1 is a diagram of an exemplary system for adaptive vehicle control.

A system 100 for adaptive vehicle subsystem control is shown in FIG. 1. In the present context, "adaptive control" means adjusting control parameters based on system 100 operating conditions. Adaptive control can be achieved through a vehicle 101 controller 105 in communication with one or more vehicle 101 sub-systems 110 and one or more sensors 115. The controller 105 includes a memory storing baseline reference parameters, and adapted reference parameters. A lookup table is an example of how reference parameters are stored. The baseline reference parameters are typically a default set of reference parameters calibrated during the development of the vehicle 101, and may include one or more parameters for use by the controller 105 to control the operation of the vehicle 101. The adapted reference parameters include parameters corresponding to the parameters in the set of baseline reference parameters that are adapted to optimize the operation of the vehicle 101 based on operating conditions such as transient conditions and environmental conditions.

The vehicle 105, upon initial operation, e.g., the first time that the vehicle 101 is operated, operates according to the baseline reference parameters. Subsequently, the vehicle controller 105 receives data from vehicle sensors 115 and vehicle sub-systems 110. Based on this data, the controller develops a state space model of the vehicle 101. The state space model characterizes the dynamic behavior of the vehicle 101.

Based on the state space model of the vehicle 101, and further based on data from the vehicle sensors 115 and vehicle sub-systems 110, the controller 105 estimates a state of the state space model for the vehicle 101. The estimated state of the vehicle is a numerical representation of the operation of the vehicle 101 at a particular time, corresponding to a particular time step in an iterative vehicle 101 control process.

Based on the estimated state of the state space model for the vehicle 101, the controller 105 is programmed to apply a control technique, such as model predictive control (MPC), to determine an optimized set of control inputs. The optimized set of control inputs may be optimized, for example, to minimize a predetermined cost function. The predetermined cost function can include, for example, fuel consumption, a smoothness of a ride, the distance to a destination, etc.

The controller 105 is further programmed to utilize the optimized control inputs to generate and/or update the adapted reference parameters for the vehicle 101. The controller 105, may, e.g., compare the optimized control inputs with control inputs generated from the baseline reference parameters (or the most recently applied version of the adaptable lookup table). Based, e.g., on statistical analysis, the controller 115 is programmed to generate, in a first iteration, or update, in subsequent iterations, a set of adapted reference parameters, taking into account the state space model for the dynamic behavior of the vehicle 101, such that the control inputs generated from the adapted reference parameters converge to the inputs generated by the optimal controller. This can be solved by another optimization problem that minimizes the difference of the two.

System Elements

The vehicle 101 is generally a land-based vehicle 101 having three or more wheels, e.g., a passenger car, light truck, etc. The vehicle includes the controller 105, one or more sub-systems 110 and one or more sensors 115. The sub-systems 110 and sensors 115 are communicatively coupled to the controller 105.

The controller 105 is a computing device that includes a processor and a memory. The memory includes one or more types of computer-readable media, the memory storing instructions executable by the first processor for performing various operations, including as disclosed herein. Further, the controller 105 may include and/or be communicatively coupled to one or more other controllers, including e.g., vehicle components such as the sub-systems 110, and the sensors 115, which likewise as is known may include respective processors and memories. Communications may be performed, e.g., via a vehicle network that could include one or more of a controller area network (CAN) bus or local interconnect network (LIN) bus, a wired and/or wireless in-vehicle local area network (LAN), e.g., using wired or wireless technologies such as Wi-Fi®, Bluetooth®, etc., as is known.

The one or more sub-systems 110 for the vehicle 101 may include electronic control units (ECUs) or the like such as are known including, as non-limiting examples, an engine controller, a valve controller, a seat controller, a power steering controller, a door lock controller, a door latch controller, a climate controller, a mirror adjustment controller, a seatbelt controller, a brake controller, etc. Each of the sub-systems 110 may include respective processors and memories and one or more actuators. The sub-systems 110 may be programmed and connected to a vehicle 101 communications bus, such as a controller area network (CAN) bus or local interconnect network (LIN) bus, to receive instructions from the controller 105 and control actuators based on the instructions.

Additionally, the sub-systems 110 may be programmed to receive computer updates from the controller 105, and to store the computer updates in memories associated with the sub-systems 110. In some cases, the memories associated with the controllers may be non-volatile memories, which can maintain the stored computer updates after power has been removed from the controller 105.

The vehicle 101 controller 105 memory stores the baseline reference parameters and the adapted reference parameters. As described in additional detail below, the controller 105, based on the dynamic behavior of the vehicle 101 during operation, updates the adapted reference parameters to include parameters that account for dynamic vehicle behavior. The controller 105 is programmed to subsequently apply the updated adapted reference parameters for operating the vehicle 101, resulting in optimized operation of the vehicle 101.

Exemplary Process Flows

Figure 2:
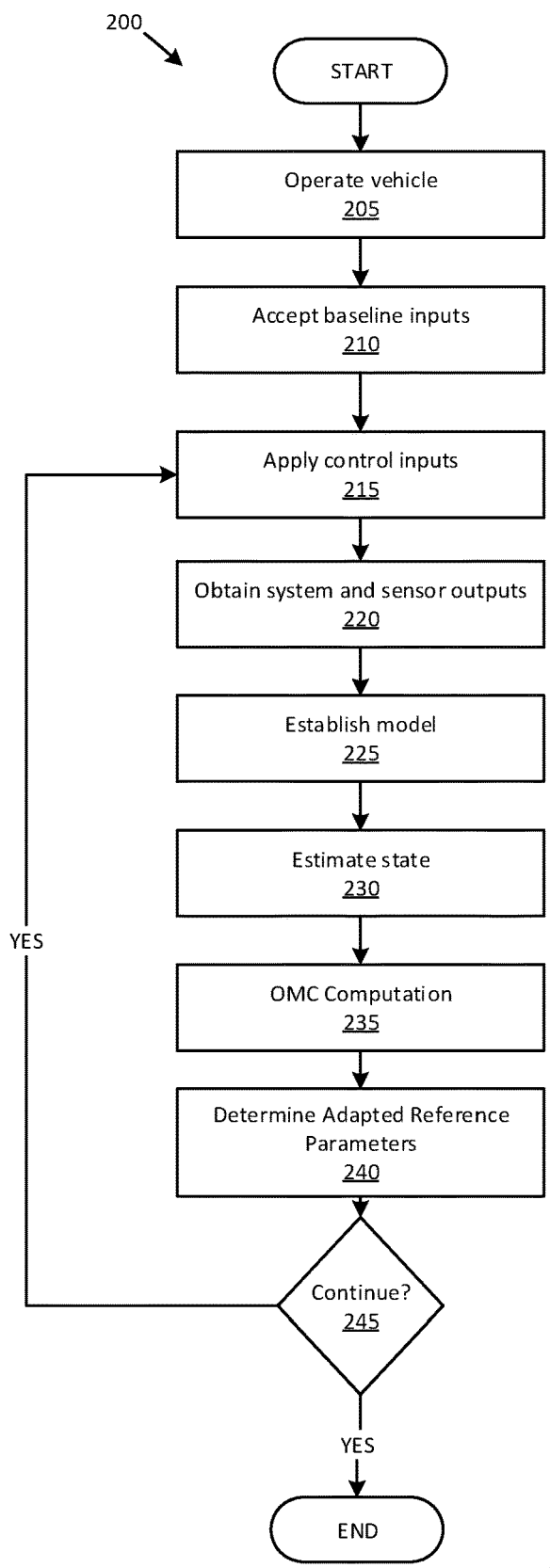
FIG. 2 is a diagram of an exemplary process for adaptive vehicle control.

FIG. 2 is a diagram of an exemplary process 200 for adapting vehicle control. The process 200 starts in a block 205.

In the block 205, operation of a vehicle 101 is commenced based on baseline reference parameters. For example, a user could turn on a vehicle 101 ignition, as is known. The user may turn on the ignition directly, for example with a physical key. Alternatively, the user may turn on the ignition via a remote device. For example, a fob, mobile telephone or other remote device may transmit, via radio frequency communications, an instruction to the controller 105 to turn on the ignition. Upon turning on the ignition of the vehicle 101, the process continues in a block 210.

In the block 210, the controller 105 accepts baseline inputs. The baseline inputs include input data from sensors 115 based on user inputs, operating data from sensors 115 based on a current operating condition of the vehicle 101, and operating data from controllers associated with the one or more sub-systems 110. For example, the user may provide input via a gas pedal, a brake pedal, a steering wheel, etc., said input providing data concerning the applicable vehicle component, e.g., a position of a steering wheel, gas pedal, brake pedal, etc. Sensors 115 associated with the gas pedal, the brake pedal, the steering wheel, etc., may generate sensor 115 input data and provide the sensor 115 input data to the controller 105. Additionally, sensors 115, and controllers associated with the vehicle 101 sub-systems 101 may provide operating data indicating vehicle operating conditions. For example, sensors 115 may indicate an engine temperature, a tire pressure, a vapor pressure in a fuel tank, etc., and controllers may report a condition of actuators such as position, speed of rotation, etc.

Additionally, the controller 105 receives baseline reference parameters. For example, the controller 105 may retrieve the baseline reference parameters from the memory associated with the controller 105. Upon receiving the input data, the operating data, and the baseline reference parameters, the process 200 continues in a block 215.

In the block 215, the controller 105 generates, based on the collected data from the sub-systems 110, the sensors 115 and the baseline reference parameters, a set of control inputs for one or more vehicle 101 sub-systems 110 and applies the control inputs to the vehicle 101 sub-systems 110. The control inputs are instructions to one or more of the sub-systems 110 to perform particular vehicle operations. For example, the control inputs may instruct the engine to operate at a particular speed, instruct a transmission to adjust a gear ratio in the powertrain, the brake system to release pressure from the brakes, the steering system to adjust a steering angle of the front wheels, etc.

The one or more vehicle 101 sub-systems 110 receive the controller 105 instructions and respond by adjusting the operation of actuators associated with respective sub-system(s) 110. The vehicle 101 exhibits a response to actuation of the one or more subsystems 110 by, e.g., changing a speed or direction of movement. The process 200 then continues in a block 220.

In the block 220, the controller 105 receives updated operating data representing the operation of the vehicle 101 from sub-systems 110 and/or sensors 115. The updated operating data includes system outputs such as vehicle 101 speed, vehicle 101 direction of travel, vehicle 101 acceleration, etc. The operating data further includes data from vehicle 101 sub-systems 110 such as engine speed, transmission gear ratio, wheel steering angle, brake pressure, etc. The process 200 continues in a block 225.

In the block 225, the controller 105, based on the control inputs generated in the block 215, and the input data and operating data collected in the block 220, generates a state space model for the vehicle 101. The state space model is generated according to the sub-process 300 illustrated in FIG. 3 and discussed below. In general, the state space model characterizes the dynamic behavior of the vehicle 101. Upon generation of the state space model for the vehicle 101, the process 200 continues in a block 230.

In the block 230, the controller 105 estimates a state of the state space model for the vehicle 101.

The state space model is described by the following equations and the state x is estimated with estimation algorithms, e.g., the Kalman Filter:

$$x(k+1)=Ax(k)+Bu(k)+w(k) \qquad \text{Eq. 1}$$

wherein $w(k) \sim \mathcal{N}(O,W)$ $$y(k)=Cx(k)+v(k) \qquad \text{Eq. 2}$$

wherein $v(k) \sim \mathcal{N}(O,V)$

Here, w(k) and v(k) are independent and identically distributed (i.i.d.) random variables of Gaussian distribution whose means are 0 and covariance matrices are W and V respectively.

The Kalman Filter may perform a measurement update based on:

$$\hat{x}_{k|k}=\hat{x}_{k|k-1}+\Sigma_{k|k-1}C^T(C\Sigma_{k|k-1}C^T+V)^{-1}(C\Sigma_{k|k-1}C^T+V)(y_k-C\hat{x}_{k|k-1}) \qquad \text{Eq. 3}$$

$$\Sigma_{k|k}=\Sigma_{k|k-1}-\Sigma_{k|k-1}C^T(C\Sigma_{k|k-1}C^T)^{-1}C\Sigma_{k|k-1} \qquad \text{Eq. 4}$$

Here, $\hat{x}$ means the estimated state (where the state is represented by x). $\hat{x}_{k|k}$ (at a measurement update) means it is the estimation of x(k) at a time k.

The controller 105 may further perform a time update based on:

$$\hat{x}_{k+1|k}=A\hat{x}_{k|k}+Bu(k) \qquad \text{Eq. 5}$$

$$\Sigma_{k+1|k}=A\Sigma_{k|k}A^T+W \qquad \text{Eq. 6}$$

The equation 5 represents the estimated state of the state space model.

Upon estimating the state of the state space model for the vehicle 101, the process 200 continues in a block 235.

In the block 235, the controller 105 computes optimized control inputs u based on a control model. For example, model predictive control (MPC) may be used to determine an optimized set of control inputs u.

The controller 105 may establish a convex optimization problem with, for example, a cost model, and identify control inputs by solving this problem. An example cost model to minimize speed tracking error and fuel consumption while satisfying constraints on actuator range and combustion stability is shown below.

$$\text{minimize } \Sigma_{k=t}^{t+T}\{w_1[y_1(k)-y_{1,r}(k)]^2+w_2u_6^2(k)\} \quad \text{Eq. 7}$$

subject to: $x(k+1)=Ax(k)+Bu(k)$ $y(k)=Cx(k)$ $u_{min} \leq u(k) \leq u_{max}$ $k=t, t+1, \ldots, t+T$ $y_2(k)=C_2x(k) \leq y_{2,b}$ For T=2, the optimization variables are (u(k), u(k+1), x(k+1), x(k+2)). $y_1$ is the vehicle speed, $y_{1,r}$ is the reference speed and $y_2$ is the output that captures the combustion stability condition and $u_6$ represents the fuel quantity. In this case, the MPC control inputs u(k) calculated according to the optimization approach described above.

Upon computing the optimized control inputs u, the process continues in a block 240.

In the block 240, the controller 105 determines adapted reference parameters. The controller 105 compares, for example, the control inputs based on the baseline reference parameters with the optimized control inputs determined in the block 240. The controller 105 may perform numerical analysis such as, for example, statistical analysis or optimization schemes, to determine a set of adapted reference parameters that result in, or approximately in the inputs u, generated by optimized control. Approximately, for purposes of this disclosure means that each of the control inputs (or one or more particular control inputs), as generated based on the adapted reference parameters, are within a predetermined range of the optimized control inputs, as determined in the block 235. The predetermined range can be determined based on the cost model. For example, the predetermined range of control inputs as generated based on the adapted parameters and identified as having a strong impact on achieving cost goals may be a small range such as +/−2%. The predetermined range for other control inputs as generated by the adapted reference parameters and determined to have less impact on achieve costs goals, may be a larger range such as +/−10%. The adapted reference parameters are stored in memory, for example in the form of a lookup table. The process 200 continues in a block 245.

In the block 245, the controller 105 determines whether the process 200 should continue. For example, in a case that the vehicle 101 continues to operate, the process 200 continues in the block 215. In a case that the vehicle 101 is turned off, the process 200 ends.

Figure 3:
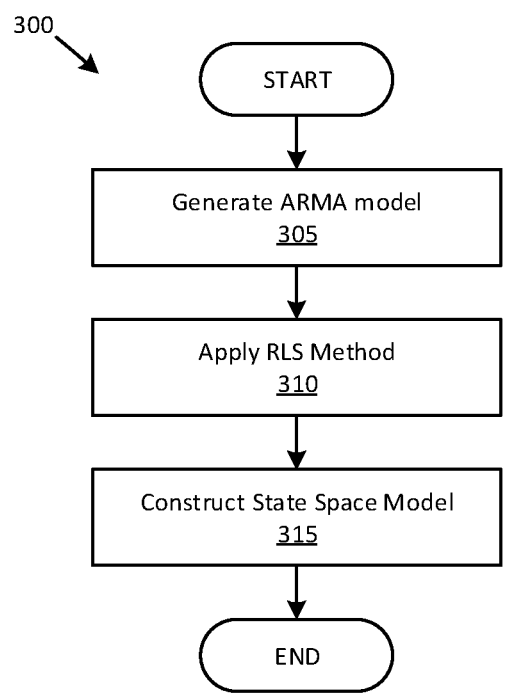
FIG. 3 is a diagram of an exemplary sub-process for generating a state space model for a vehicle.

FIG. 3 is a diagram of an exemplary sub-process 300 for generating a state space model for the vehicle 101. The sub-process 300 starts in a block 305.

In the block 305, the controller 105 develops a multiple inputs single output (MISO) auto-regressive moving-average (ARMA) model for system identification (system ID). The MISO (single output) case is used for ease of discussion. The sub-process 300, however, is not restricted to a MISO case, and can be extended to a multiple inputs multiple outputs (MIMO) model. An ARMA model, as used herein and as is generally known, refers to auto regressive-moving-average (ARMA) model to analyze time series.

An ARMA model as is known describes a process consisting of two parts, an autoregressive (AR) part and a moving average (MA) part. The model is usually referred to as the ARMA (p, q) model where p is the order of the autoregressive part and q is the order of the moving average part.

A MISO ARMA model for system ID for the vehicle 101 can be stated as:

$$y(k)=a_1y(k-1)+a_2y(k-2)+b_1^Tu(k-1)+b_2^Tu(k-2)+e(k)$$
$$k=2,3,\ldots,M \quad \text{Eq. 8}$$

Here, y represents an output such vehicle speed, combustion stability index, and fuel consumption. The variable u represents an input. Examples of inputs may include throttle, spark timing, intake variable cam timing ($VCT_i$), exhaust variable cam timing ($VCT_e$), WasteGate (WG), start of injection (SOI), compressor bypass valve (CBV) and injection duration. The variable e represents an error factor. M is the number of history samples that are included in the model. T means "transpose".

The parameters $a_1$, $a_2$, $b_1$, $b_2$ are all gains which correlate individual inputs (of the model) to the output. For example, $a_1$ defines how y(k−1) influences the current sampled output y(k). The parameters $a_1$, $a_2$, $b_1$, $b_2$ are assumed to vary for each M+1 time horizon. The controller 105 can estimate the parameters for the M+1 time horizon by using M+1 inputs and M+1 outputs.

M+1 of the above equations can be written compactly as:

$$Y(M)=a_1Y(M-1)+a_2Y(M-2)+b_1^TU(M-1)+b_2^TU(M-2)+E(M) \quad \text{Eq. 9}$$

$$Y(M)=[y(2),y(3),\ldots,y(M)]^T \quad \text{Eq. 10}$$

$$Y(M-1)=[y(1),y(2),\ldots,y(M-1)]^T \quad \text{Eq. 11}$$

$$Y(M-2)=[y(0),y(1),\ldots,y(M-2)]^T \quad \text{Eq. 12}$$

$$U(M-1)=[u(1),u(2),\ldots,u(M-1)]^T \quad \text{Eq. 13}$$

$$U(M-2)=[u(0),u(1),\ldots,u(M-2)]^T \quad \text{Eq. 14}$$

$$E(M)=[e(2),e(3),\ldots,e(M)]^T \quad \text{Eq. 15}$$

Upon developing the MISO ARMA model, the sub-process 300 continues in a block 310.

In the block 310, the controller 105 may apply a regularized least square (RLS) method for system identification. According to the RLS method, the controller 105 solves the following problem to obtain the parameters $a_1$, $a_2$, $b_1$, $b_2$:

$$\text{minimize } \|Ax-b\|^2+\mu\|Fx\|^2 \quad \text{Eq. 16}$$

wherein:
b=Y(M),
A=[Y(M−1), Y(M−2), U(M−1)$^T$, U(M−2)$^T$],
$x^T=[a_1\ a_2\ b_1^T\ b_2^T]$ is the vector of estimated parameters,
F is a diagonal matrix that contains the weights associated with each parameter,
and μ is a penalty coefficient characterizing the impact of the constraint on the norm of the vector of estimated parameters.

The RLS method allows the controller to estimate the parameters $a_1$, $a_2$, $b_1$, $b_2$. Further, according to the RLS method, by designing the weight matrix F properly, the controller can regularize the parameters such that the estimated space model is stable for further state estimation with one or more Kalman Filters. Typically, current outputs have a stronger correlation to their previous values than to the inputs. According to the RLS method, the controller 105 can design F to establish a stronger correlation between inputs u and outputs y. An analytical solution for RLS can be expressed as:

$$x^*=(\mu FF^T+A^TA)^{-1}A^Tb \quad \text{Eq. 17}$$

Upon developing the analytical solution for RLS, the sub-process 300 continues in a block 315.

In the block 315, the controller 105 develops a state space model for the vehicle 101 based on the RLS solution.

Once the parameters $a_i$ and $b_i$, i=1, 2 are obtained by the RLS method, a state space model can be obtained from the ARMA model Eq. 8. The state space model can be written as $$x_1(k+1)=Ax(k)+Bu(k) \quad \text{Eq. 18}$$

$$y(k)=Cx(k). \quad \text{Eq. 19}$$

Here, A, B, and C are matrices with appropriate dimensions and can be functions of the identified parameters $a_i$ and $b_i$, i=1, 2. x(k) is the internal state of the state space model and may not be physically measurable.

The sub-process 300 can be extended to the multiple input multiple output (MIMO) case by setting zero coupling between outputs. The internal states of the system may not be physical quantities and it is necessary to obtain their respective estimated values.

The regularized least squares method is only one example for identifying the system. Other methods, such as recursive least square, least mean squares filter, Kernel adaptive filter, other adaptive filtering approaches and/or other methods based on solving constrained optimization problems may also be used.

The matrices A, B and C characterize the vehicle 101 system's dynamic behavior. Upon calculating the matrices A, B, and C, the sub-process 300 ends.

Example Simulation

FIGS. 4-7 show results of an example simulation of vehicle operation based on adapted reference parameters. The example simulation indicates that adapted calibration (calibration based on adapted reference parameters) can allow good speed profile tracking while at the same time improving fuel economy by about 7.5%.

Figure 4:
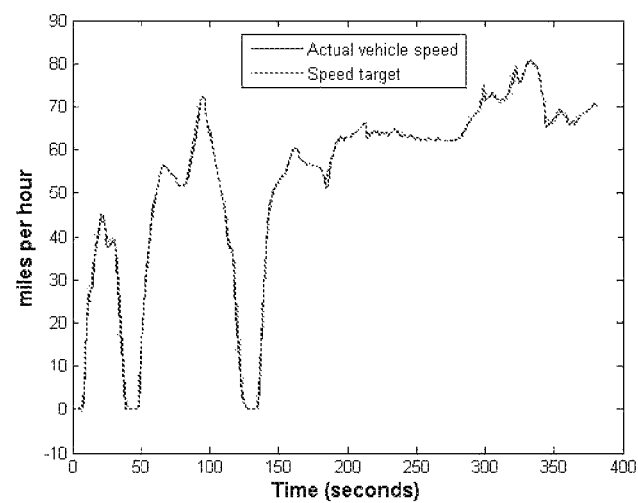
FIG. 4 is a diagram of a simulation showing speed tracking of a vehicle operating according to adapted reference parameters.

FIG. 4 shows a simulated speed of a vehicle using adapted reference parameters as compared to a target speed for a time period of 400 seconds.

Figure 5:
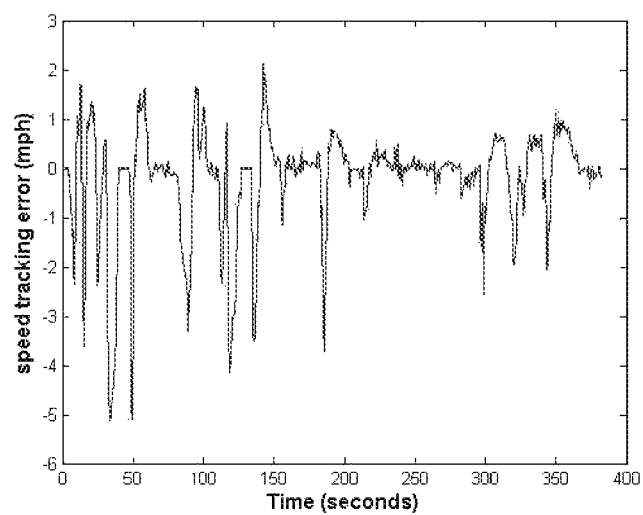
FIG. 5 is a diagram of a simulation showing a difference of a vehicle simulated speed based on adapted reference parameters to a vehicle target speed.

FIG. 5 shows a speed tracking error for the same time frame as FIG. 4. As can be seen in FIG. 5, the actual speed generally tracks the target speed within 1 mph, except for brief transients.

Figure 6:
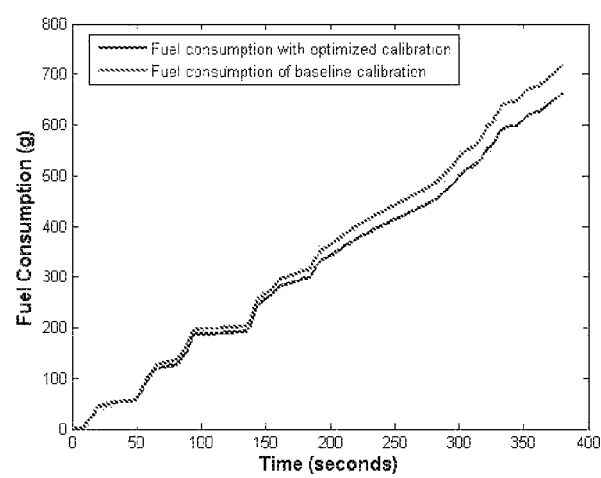
FIG. 6 is a diagram of simulated fuel consumption based on adapted reference parameters and simulated fuel consumption based on baseline reference parameters.

FIG. 6 is a graph of fuel consumption with adapted reference parameters as compared to a baseline fuel consumption based on baseline reference parameters. The graph indicates a fuel consumption reduction of approximately 7.5%.

Figure 7:
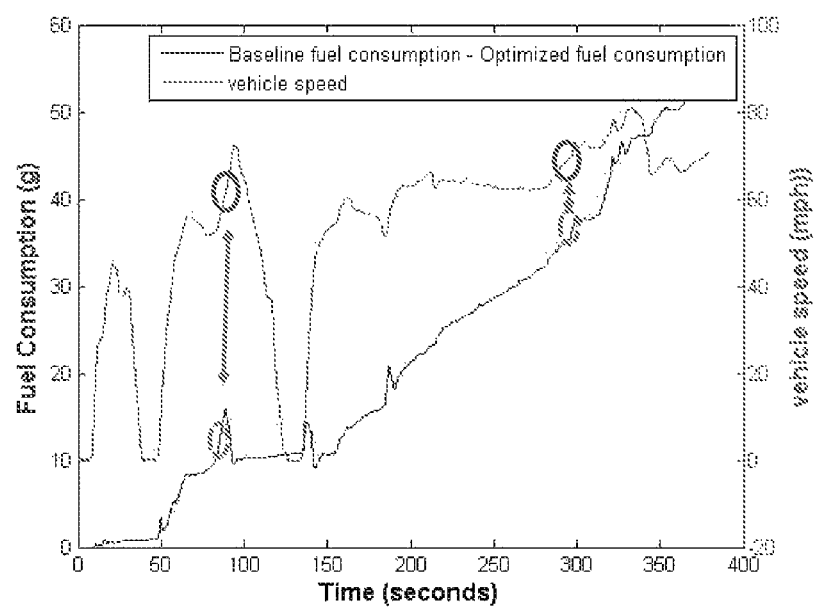
FIG. 7 is a diagram showing the difference between fuel consumption based on baseline reference parameters and fuel consumption based on baseline reference parameters.

FIG. 7 is a graph of the difference between baseline fuel consumption and adapted fuel consumption (i.e., the instantaneous improvement in fuel consumption), displayed together with vehicle speed. As can be seen, during transients, when the vehicle speed is increasing, fuel consumption improves at a higher rate. This is an indication that the adapted reference parameters handle transient conditions better than baseline reference parameters.

CONCLUSION

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A system comprising:
   a controller including a processor and a memory, the memory storing instructions executable by the processor such that the processor is programmed to:

determine, for a vehicle, a first set of control inputs for the vehicle based in part on input data and one or more first reference parameters;

collect operating data from the vehicle while operating according to the first set of control inputs;

determine an estimated state of a state space model for the vehicle based on the operating data from the vehicle while operating according to the first set of control inputs;

determine, based in part on the estimated state of the state space model, a second set of control inputs for the vehicle, such that a cost of operating the vehicle according to the second set of control inputs is reduced relative to the cost of operating the vehicle based on the first set of control inputs;

specify one or more second reference parameters based in part on the second set of control inputs and the input data, such that the one or more second reference parameters, when applied to the input data, results in a third set of control inputs, wherein members of the third set of control inputs are within respective predetermined ranges of corresponding members of the second set of control inputs, and operate the vehicle based on at least one of the one or more second reference parameters.

2. The system of claim 1, wherein the processor is further programmed to:

generate, based on the input data and the operating data, the state space model of the vehicle.

3. The system of claim 2, wherein the processor is further programmed to:

generate a dynamic model for the vehicle;

estimate a set of parameters correlating individual inputs of the model to the output of the model for the operating condition; and take into account the set of parameters correlating individual inputs of the model to the output of the model for determining the second control input.

4. The system of claim 3, wherein the processor is further programmed to:

apply a regularized least squares method for estimating the set of parameters.

5. The system of claim 1, wherein the processor is further programmed to:

apply a Kalman filter to estimate the state of the state space model.

6. The system of claim 1, wherein the cost of operating the vehicle includes fuel consumption.

7. The system of claim 1, wherein the processor is further programmed to:

determine the set of second control inputs based on a cost minimization control method.

8. The system of claim 1, wherein the processor is further programmed to:

operating the vehicle according to the third control input.

9. The system of claim 1, wherein the processor is further programmed to:

Adapt the one or more second reference parameters so that the set of third control inputs converges to the set of second control inputs.

10. The system of claim 1, wherein each of the predetermined ranges is determined based in part on a relative impact on achieving cost goals.

11. A method comprising:

determining, by a processor in a vehicle, a first set of control inputs for the vehicle based in part on input data and one or more first reference parameters;

collecting operating data from the vehicle while operating according to the first set of control inputs;

determining an estimated state of a state space model for the vehicle based on the operating data from the vehicle while operating according to the first set of control inputs;

determining, based in part on the estimated state of the state space model, a second set of control inputs for the vehicle, such that a cost of operating the vehicle according to the second set of control inputs is reduced relative to the cost of operating the vehicle based on the first set of control inputs;

specifying one or more second reference parameters based in part on the second set of control inputs and the input data, such that the one or more second reference parameters, when applied to the input data, results in a third set of control inputs, wherein members of the third set of control inputs are within respective predetermined ranges of corresponding members of the second set of control inputs;

and operating the vehicle based on at least one of the one or more second reference parameters.

12. The method of claim 11, further comprising:

generating, based on the input data and the operating data, the state space model of the vehicle.

13. The method of claim 12, further comprising:

generating a dynamic model for the vehicle;

estimating a set of parameters correlating individual inputs of the model to the output of the model for the operating condition; and taking into account the set of parameters correlating individual inputs of the model to the output of the model for determining the second control input.

14. The method of claim 13, further comprising:

applying a regularized least squares method for estimating the set of parameters.

15. The method of claim 11, further comprising:

applying a Kalman filter to estimate the state of the state space model.

16. The method of claim 11, wherein the cost of operating the vehicle includes fuel consumption.

17. The method of claim 11, further comprising:

determining the set of second control inputs based on a cost minimization control method.

18. The method of claim 11, further comprising:

operating the vehicle according to the set of third control inputs.

19. The method of claim 11, wherein the processor is further programmed to:

adapting the one or more second reference parameters so that the third set of control inputs converges to the second set of control inputs.

20. The method of claim 11, wherein each of the predetermined ranges is determined based in part on a relative impact on achieving cost goals.

* * * * *